(12) United States Patent
Martin et al.

(10) Patent No.: US 7,774,467 B1
(45) Date of Patent: Aug. 10, 2010

(54) MECHANISM FOR MAKING A COMPUTING RESOURCE ALLOCATION

(75) Inventors: Jean-Christophe Martin, San Jose, CA (US); Junaid Saiyed, Sunnyvale, CA (US); Yulin Xu, Fremont, CA (US)

(73) Assignee: Oracle America Inc., Redwood City, CA (US)

( * ) Notice: Subject to any disclaimer, the term of this patent is extended or adjusted under 35 U.S.C. 154(b) by 1722 days.

(21) Appl. No.: 10/948,587

(22) Filed: Sep. 22, 2004

(51) Int. Cl.
*G06F 15/173* (2006.01)

(52) U.S. Cl. .................. 709/226; 709/201; 709/202; 709/203; 709/206; 709/218; 709/223; 709/224; 709/225; 711/170; 711/173; 711/147; 711/153; 715/772; 712/15; 712/13; 718/104; 718/105; 718/106

(58) Field of Classification Search .......... 709/226, 709/223–225, 201–203, 206, 218
See application file for complete search history.

(56) References Cited

U.S. PATENT DOCUMENTS

| | | | | |
|---|---|---|---|---|
| 5,655,148 A | * | 8/1997 | Richman et al. | 710/8 |
| 5,793,979 A | * | 8/1998 | Lichtman et al. | 709/226 |
| 5,825,759 A | * | 10/1998 | Liu | 370/331 |
| 6,003,061 A | * | 12/1999 | Jones et al. | 718/104 |
| 6,336,152 B1 | * | 1/2002 | Richman et al. | 710/8 |
| 6,381,321 B1 | * | 4/2002 | Brown et al. | 379/207.02 |
| 6,584,489 B1 | * | 6/2003 | Jones et al. | 718/104 |
| 6,763,454 B2 | * | 7/2004 | Wilson et al. | 713/1 |
| 7,150,020 B2 | * | 12/2006 | Kalhour | 718/104 |
| 7,308,511 B2 | * | 12/2007 | Wilson et al. | 710/8 |
| 2003/0009694 A1 | * | 1/2003 | Wenocur et al. | 713/201 |
| 2003/0041088 A1 | * | 2/2003 | Wilson et al. | 709/104 |
| 2004/0128576 A1 | * | 7/2004 | Gutman et al. | 713/323 |
| 2004/0205258 A1 | * | 10/2004 | Wilson et al. | 710/1 |
| 2004/0250041 A1 | * | 12/2004 | Sollich | 711/170 |
| 2005/0120160 A1 | * | 6/2005 | Plouffe et al. | 711/1 |
| 2005/0222819 A1 | * | 10/2005 | Boss et al. | 702/186 |
| 2005/0262509 A1 | * | 11/2005 | Kelly | 718/104 |

* cited by examiner

*Primary Examiner*—John Follansbee
*Assistant Examiner*—Saket K Daftuar
(74) *Attorney, Agent, or Firm*—Osha + Liang LLP

(57) ABSTRACT

In accordance with one embodiment of the present invention, there are provided methods and mechanisms for determining an allocation of resources, including hardware resources in a computing environment. With these methods and mechanisms, it is possible for computing resource allocations to satisfy one or more operational considerations, such as for example without limitation: "reduce device heat dissipation", "avoid single point of failure in switched network" and other allocation needs are contemplated.

17 Claims, 6 Drawing Sheets

MECHANISM FOR MAKING A COMPUTING RESOURCE ALLOCATION

BACKGROUND

In many virtualized data center implementations, it is desirable to allocate resources, including hardware resources in a computing environment responsive to requests. In conventional approaches, when an allocation request is generated, current software typically chooses the resources from the pool of available ones in a random fashion; not taking into account any specific allocation requirements based on user's request or preferred system usage. These allocation requirements from user's request are things such as "give me device #1234", "give me a Cisco firewall, (instead of any other vendor)", "give me a Solaris box with at least 4 Gb memory".

While conventional approaches directed to automating resource allocation seek to dynamically provision computing resources in response to requests, such conventional approaches fail to consider the impact of the provisioning decision on operational considerations, such as reducing device heat dissipation, avoiding single points of failure in a switched network and so forth.

Accordingly, without a resource allocation mechanism that considers such needs, conventional approaches can provide resource allocations that result in sub-optimal or even non-workable configurations in which incompatible resources may be selected, resources may be placed physically too close, more dissipated heat is generated than necessary or too many components are shared, thereby creating a single point of failure.

SUMMARY

In accordance with one embodiment of the present invention, there are provided methods and mechanisms for determining an allocation of resources, including hardware resources in a computing environment. With these methods and mechanisms, it is possible for hardware resource allocations to satisfy one or more one or more operational considerations, such as for example without limitation: "reduce device heat dissipation", "avoid single point of failure in switched network" and other policy based allocation needs are contemplated.

In one embodiment, a set of one or more allocations of computing resources, including hardware resources is determined. Computing resources includes host computers, firewalls, loader balancers, storage devices (local disk/NAS/SAN), processors, storage devices, peripheral devices, devices operable with a computer or processor based devices that enhance the functionality of the computer or processor based device, in computing environments in which these computing resources are virtualized and allocated on demand. Embodiments can make the determination based upon factors including topology (physical rack location, switch connections, power controller connections), quality of service requirements, high level rules, key performance indicators (KPIs), Service Level Objectives (or goals), Quality of Service attributes (QoS attributes) and other criteria are contemplated. In one embodiment, a linear programming process determines a "best" allocation to satisfy the request.

In one embodiment, a request for an allocation of a set of hardware resources in a computing system is received. The computing system is a distributed system comprising a plurality of physically distributed hardware resources. A set of one or more operational considerations to be applied to the allocation is determined. At least one set of eligible hardware resources that satisfies the request is automatically determined. Determining the set of eligible hardware resources takes into account where each of the eligible hardware resources is physically situated relative to other physical resources and how that situation impacts the set of operational considerations.

The present invention enables allocating resources, including hardware resources in a computing environment in view of satisfying one or more operational considerations. This ability to allocate resources in view of satisfying one or more operational considerations makes it possible to attain improved efficiency from these resources.

DETAILED DESCRIPTION OF EMBODIMENT(S)

Conceptual Overview

In accordance with one embodiment of the present invention, there are provided methods and mechanisms for determining an allocation of resources, including hardware resources in a computing environment. With these methods and mechanisms, it is possible for computing resource allocations to satisfy one or more operational considerations, such as for example without limitation: "reduce device heat dissipation", "avoid single point of failure in switched network" and other allocation needs are contemplated. While an example embodiment that allocates hardware resources in a distributed data center will be used to illustrate techniques in accordance with the invention, it will be apparent to a skilled person that the principles of the invention are more broadly applicable to resource allocations based on parameters derived and/or calculated from topology or operational attributes. Accordingly, the examples described herein are intended to be illustrative rather than limiting of the many applications of embodiments of the present invention.

Figure 3A:
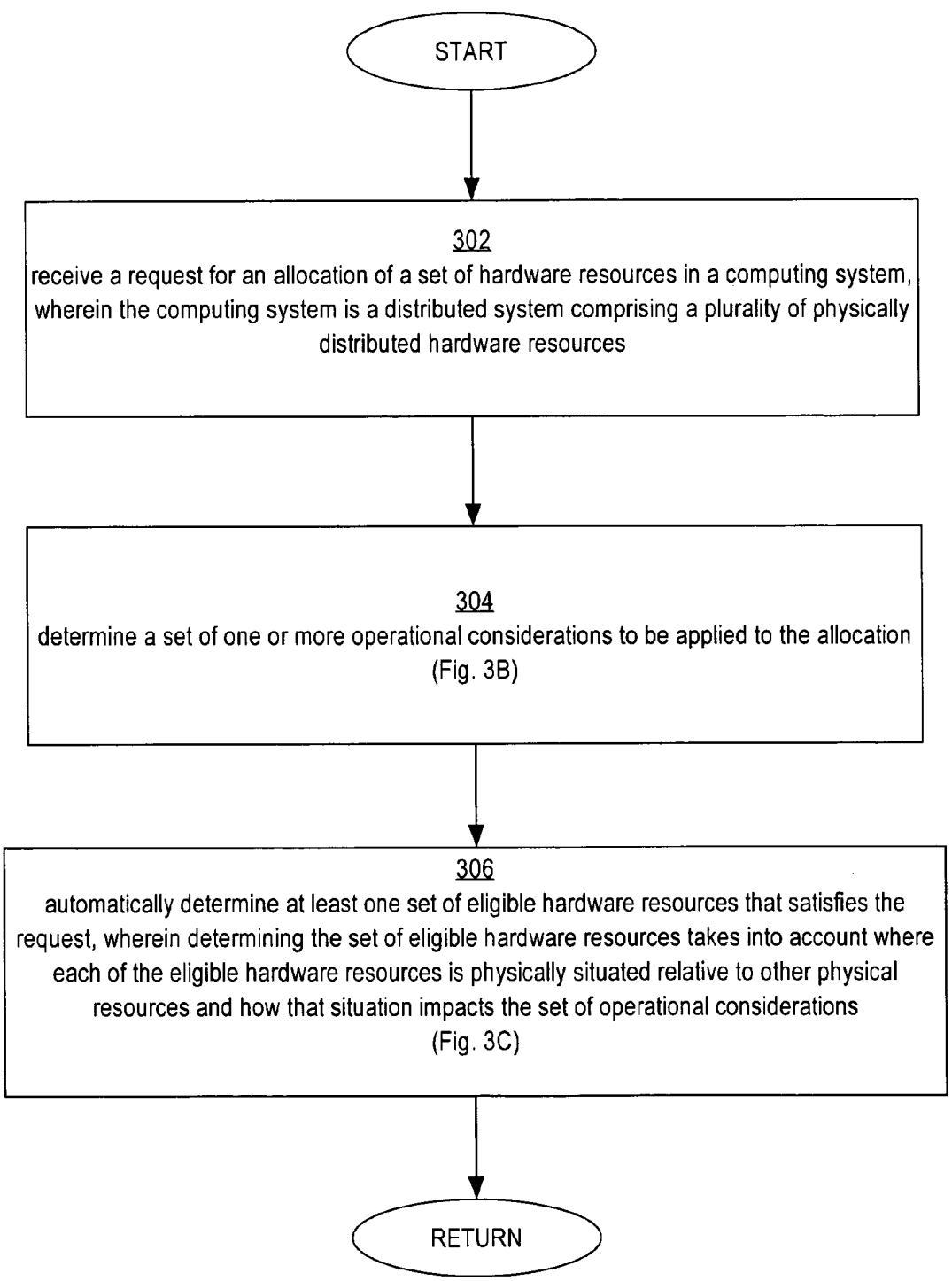
FIG. 3A is an operational flow diagram illustrating the operation of one embodiment of the present invention.

In one embodiment, a set of one or more allocations of computing resources, including hardware resources is determined. Computing resources includes host computers, firewalls, loader balancers, storage devices (local disk/NAS/SAN), processors, storage devices, peripheral devices, devices operable with a computer or processor based devices that enhance the functionality of the computer or processor based device, in computing environments in which these computing resources are virtualized and allocated on demand. Embodiments can make the determination based upon factors including topology (physical rack location, switch connections, power controller connections), quality of service requirements, high level rules, key performance indicators (KPIs), Service Level Objectives (or goals), Quality of Service attributes (QoS attributes) and other criteria are contemplated. In one embodiment, a linear programming process determines a "best" allocation to satisfy the request. An operational flow diagram, which provides a high level overview of one embodiment of the present invention, is shown in FIG. 3A.

In one embodiment, a request for an allocation of a set of hardware resources in a computing system is received (block 302). The computing system is a distributed system comprising a plurality of physically distributed hardware resources. A set of one or more operational considerations to be applied to the allocation is determined (block 304). At least one set of eligible hardware resources that satisfies the request are automatically determined (block 306). Determining the set of eligible hardware resources takes into account where each of the eligible hardware resources is physically situated relative to other physical resources and how that situation impacts the set of operational considerations.

In one embodiment, determining the set of eligible hardware resources includes accessing a set of topology information. The topology information specifies how the hardware resources in the computing system are physically arranged and situated. The set of eligible hardware resources is determined using the set of topology information. In various embodiments, determining a set of one or more operational considerations to be applied to the allocation includes determining a set of one or more of: reducing heat production, reducing latency, increasing availability, reducing power dissipation and other operational considerations are contemplated.

In one embodiment, automatically determining at least one set of eligible hardware resources includes automatically determining a plurality of sets of eligible hardware resources that satisfy the request. The set of eligible hardware resources that provides the best performance according to a set of predetermined guidelines is selected.

In one embodiment, selecting the set of eligible hardware resources that provides the best performance according to a set of predetermined guidelines can be achieved using an objective function. An objective function that relates one or more goals to one or more quantities representing physical characteristics that are changed by a change in allocation of the one or more available resources can be determined. For example, objective functions can be determined for relating any of: reducing heat dissipation to a thermal index that changes with a distance between components, reducing latency to a latency index that changes with positioning of components in same housings, or on same busses, or in same datacenters, increasing redundancy to a redundancy index that changes with common components, and other relationships are contemplated.

In another aspect, the invention provides in one embodiment a method for determining an resource allocation. A set of one or more available hardware resources for satisfying a request to allocate hardware resources is determined from a collection of hardware resources. An objective function relating one or more goals to one or more quantities representing physical characteristics that are changed by a change in allocation of the one or more available hardware resources is determined. A set of one or more constraint expressions for imposing constraints upon permissible values for the one or more quantities is determined. At least one resource allocation that satisfies the request and satisfies the set of one or more constraint expressions and the one or more goals based upon the objective function is selected.

In other aspects, the invention encompasses in some embodiments, computer apparatus, computing systems and machine-readable media configured to carry out the foregoing methods.

Embodiments can determine computing resource allocations that satisfy requests and one or more operational considerations.

System Overview

Figure 1:
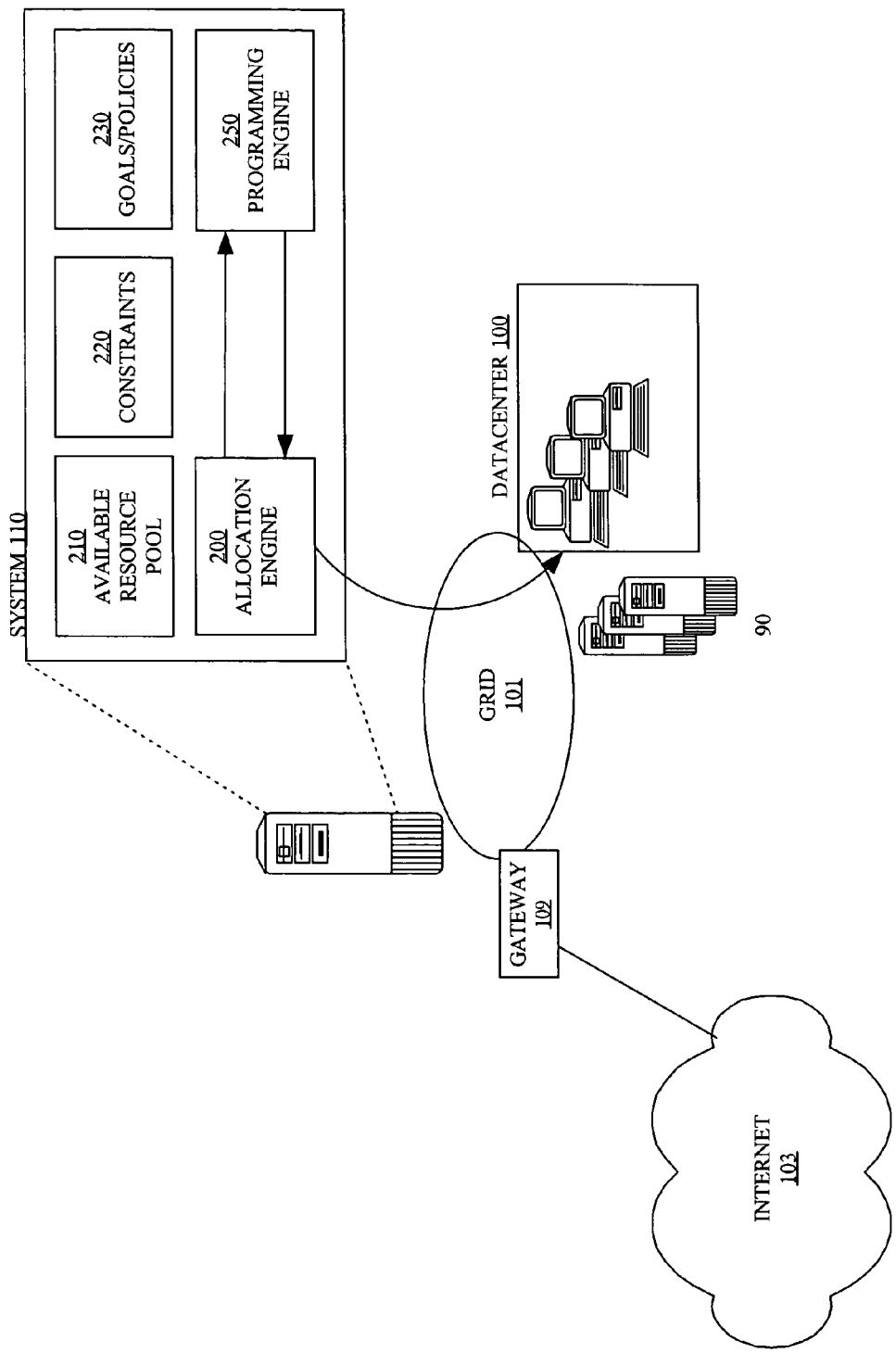
FIG. 1 is a functional block diagram of an example computing environment in which one embodiment of the present invention may be implemented.

FIG. 1 is a functional block diagram of an example computing environment in which determining an allocation of hardware resources in one embodiment of the present invention may be implemented. While the present invention is illustrated with reference to example embodiments using a grid computing environment, the invention is not limited to these embodiments. Further, the grid computing environment is not required to implement other embodiments. For example, in some embodiments, techniques according to the invention may be implemented in stand-alone computer systems, network centric computing systems, e-commerce applications, a computing system acting as a service processor for other computing systems and computing systems with other configurations are contemplated.

As shown in FIG. 1, an example grid computing environment in which one embodiment of the present invention may be implemented includes a computing grid 101. Computing grid 101 comprises a variety of interconnected computing resources, including computing resources 90 and 100 managed by system 110, which acts as a resource manager for the grid. Optionally, a gateway 109, which can be a modem, router, local area network (LAN) connection, wide area network (WAN) connection, or other device or devices that provides connectivity can provide connectivity with Internet 103 or other publicly accessible networks. In various embodiments, system 110 and computing resources 90 and 100, may be connected by any one or more other variety of connections including networks, both public or private, wire-less or wired communications links, Virtual LAN (VLAN) based networks, shared memory interconnections, optical interconnections and other mechanisms and methods providing connectivity are contemplated.

System 110 includes a number of components that enable system 110 to act as a resource manager for the grid. For example, system 110 includes allocation engine 200, which controls workflow and client requests into the resources 90, 100 of the grid 101, as well as results and responses from applications deployed on the resources 90, 100 of the grid 101. Allocation engine 200 determines allocations of computing resources within the grid 101 in order to satisfy the client requests using a process described in further detail below with reference to FIGS. 3A-3C.

Computing resources 90 and 100 include any number and variety of computing resources. The computing resources 90, 100 can be co-located in a single datacenter or geographically dispersed. For example, in the example embodiment shown in FIG. 1, computing resources 100 are organized into a datacenter 100.

Computing resources 90 and 100 can include hardware upon which one or more operating systems and one or more applications may be deployed. Multiple applications may execute on separate nodes of grid 101. The applications may function together to provide one or more services. Services can include without limitation, financial transactions, i.e., banking, equity and commodity trading; merchandise sales, i.e., book sales clothing sales; consumer and business services, i.e., travel agency, equipment rental; an internet service provider (ISP) and other services implemented upon a computer are contemplated. For example an ISP may include various services components, such as without limitation routers, switches, servers and other hardware and software that provide infrastructure to the ISP services. The example services include without limitation DSL provisioning, frame relay circuits, web hosting, mail hosting and communication infrastructure provisioning and related services, as well as computing and data resource infrastructure and related services.

Allocation engine 200 determines one or more sets of allocations of hardware resources within the grid 101 in order to satisfy requests taking into account where each of the hardware resources is physically situated relative to other physical resources and how that situation impacts a set of operational considerations. In one embodiment, allocation engine 200 converts the operational considerations into one or more constraints 220 on the use of computing resources and one or more goals reflecting policies 230. An available resource pool 210 enables allocation engine 200 to manage information about the types and configurations of computing resources 90, 100 in the grid 101. Allocation engine 200 invokes a programming engine 250 that uses a linear programming process (or a non-linear programming process) to determine an allocation solution from a set of one or more potential solutions satisfying the constraints 220 to obtain a "best" hardware allocation for meeting the goal(s) 230.

An example of an embodiment in which blades are allocated into one or more racks in a datacenter 100 according to one or more operational considerations including latency, redundancy, power consumption and dissipation in one embodiment of the present invention will now be described. In the following discussion, reference will be made to the functional block diagram of FIG. 2 and the flow diagrams of FIGS. 3A-3C. It will be apparent to persons skilled in the art that embodiments may be created using other and/or additional operational considerations, such as without limitation, cost, performance, availability, service levels, Quality of Service attributes (QoS attributes) and other operational considerations are contemplated.

Figure 2:
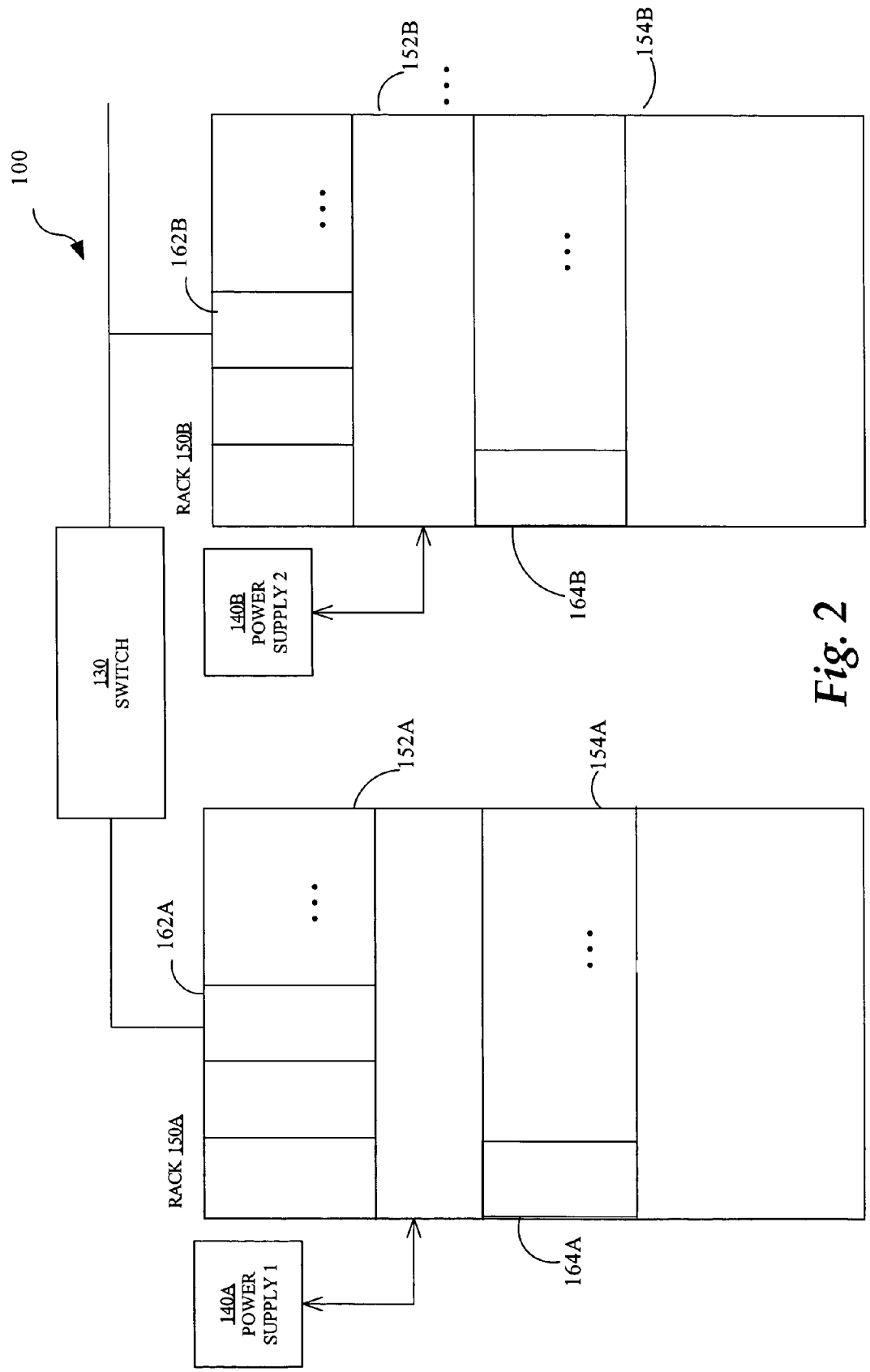
FIG. 2 is functional block diagram of hardware resources in a computing environment of FIG. 1 in one embodiment of the present invention.

FIG. 2 is functional block diagram of hardware resources in a computing environment of FIG. 1 in one embodiment of the present invention. While one embodiment is illustrated with reference to an example application in which "blade computers" ("blades"), i.e., computer hardware implemented on a card that is pluggable into a rack, are allocated in various configurations in a datacenter, embodiments are not limited to this application. As shown in FIG. 2, blade computers are arranged horizontally in shelves, such as blade computer 162A in shelf 152A and blade computer 164A in shelf 154A. The shelves are arranged vertically in one or more racks, such as rack 150A, 150B in datacenter 100. Each blade is connected to a switch (not shown) in the shelf, each shelf is connected to a switch (not shown) in the rack, each rack is connected to a switch 130 in the data center 100. An allocation request comprises a specification of the number of blades to allocate, and values for one or more constraints that represent, for example, maximum values, minimum values and other constraint values are contemplated.

While discussed generally above, operational flow diagram of FIG. 3A will be referred to in connection with an example using the functional diagrams of FIG. 1 and FIG. 2 in order to provide a high level overview of a process for satisfying the allocation request for blades and satisfying one or more operational considerations in one embodiment of the present invention.

As illustrated by FIG. 3A, a request for an allocation of a set of hardware resources in a computing system is received (block 302). The computing system is a distributed system comprising a plurality of physically distributed hardware resources. A set of one or more operational considerations i.e., constraints 220 in FIG. 1, for example, to be applied to the allocation is determined (block 304). At least one set of eligible hardware resources that satisfies the request are automatically determined (block 306). Determining the set of eligible hardware resources takes into account where each of the eligible hardware resources is physically situated relative to other physical resources and how that situation impacts the set of operational considerations.

Figure 3B:
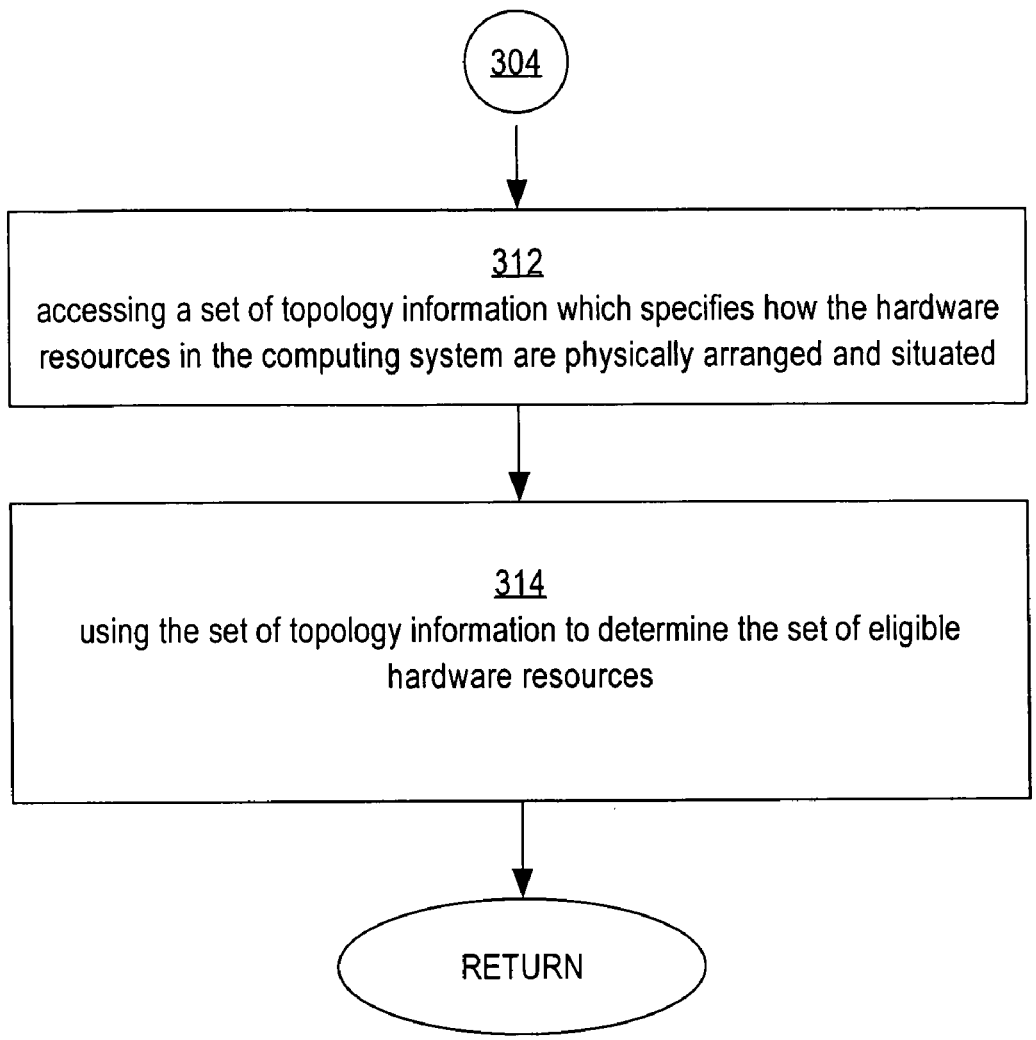
FIG. 3B is an operational flow diagram illustrating determining the set of eligible hardware resources will be described in further detail with reference to an example embodiment of the present invention.

Now with reference to FIG. 3B, determining the set of eligible hardware resources will be described in further detail with reference to an example embodiment. A set of topology information is accessed (block 312). The topology information specifies how the hardware resources in the computing system are physically arranged and situated. The set of eligible hardware resources is determined using the set of topology information (block 314). In various embodiments, determining a set of one or more operational considerations to be applied to the allocation includes determining a set of one or more of reducing heat production, reducing latency, increasing availability, reducing power dissipation and other operational considerations are contemplated.

In one embodiment, accessing a set of topology information which specifies how the hardware resources in the computing system are physically arranged and situated includes accessing a set of topology information such as without limitation one or more of a distance, including a distance representing a spatial separation of components, a configuration, including an index representing whether two processors exist in a same housing, a system state, including a Boolean expression indicating whether a resource is unavailable, a policy, including a Boolean expression indicating whether a particular operating system is permitted and other operational considerations are contemplated.

Figure 3C:
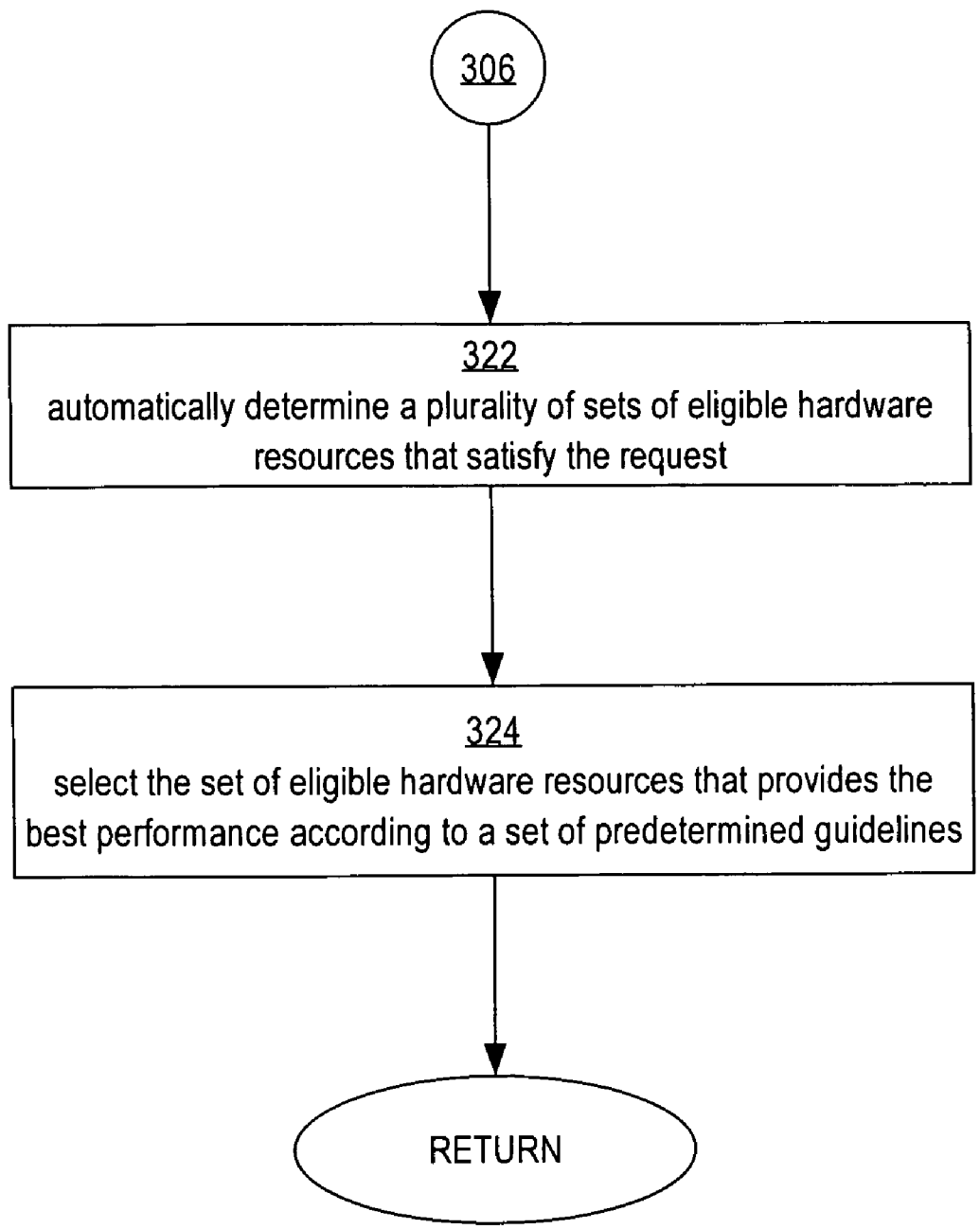
FIG. 3C is an operational flow diagram illustrating automatically determining at least one set of eligible hardware resources will be described in further detail with reference to an example embodiment of the present invention.

Now with reference to FIG. 3C, automatically determining at least one set of eligible hardware resources will be described in further detail with reference to an example embodiment. A plurality of sets of eligible hardware resources that satisfy the request are automatically determined (block 322). The set of eligible hardware resources that provides the best performance according to a set of predetermined guidelines, i.e., goals 230 in FIG. 1, for example, is selected (block 324).

In one embodiment, selecting the set of eligible hardware resources that provides the best performance according to a set of predetermined guidelines can be achieved using an objective function. The objective function that relates one or more goals to one or more quantities representing physical characteristics that are changed by a change in allocation of the one or more available resources. For example, an objective function can be determined for relating any one of: reducing heat dissipation to a thermal index that changes with a distance between components, reducing latency to a latency index that changes with positioning of components in same housings, or on same busses, or in same datacenters, increasing redundancy to a redundancy index that changes with common components, and other relationships are contemplated. A process of calculating a thermal index, a latency index and a redundancy index will be described below, again with reference to FIG. 2. While the example embodiment discussed herein with reference to FIG. 2 includes index functions to represent physical attributes, it will be apparent to a skilled person that other types of calculated parameters upon which resource allocations can be determined may be used in various embodiments of the present invention. Accordingly, the use of index functions in the described example embodiment is intended to be illustrative rather than limiting.

Again with reference to the example illustrated by FIG. 2, a first input variable is defined as the horizontal thermal index, representing the influence of the proximity of the blades, horizontally, into the power dissipation. A second input variable is defined as the vertical thermal index, representing the influence of the proximity of the blades, vertically, into the power dissipation.

A function is defined to calculate an index, representing this coupling effect, based on the position of the allocated blades 162A with the shelf 152A, and across the rack 150A. An example function to calculate a thermal index for a given position within a shelf by taking into account the distance from the already allocated adjacent positions in terms of the quantities:

Let:
LB=left blade,
RB=right blade,
DL=dissipation of the left blade,
DR=dissipation of the right blade,
d=dissipation of the new blade, and
position=position of the new blade.

Then:

$$index=d+(DL/(position-LB))+(DR/(RB-position))$$

The function can take into account the compounded dissipation of the adjacent blades (e.g. a group of 3 blades, 2 positions away will generate more heat than only one blade). The same kind of function can be used to calculate the vertical index between blades on two shelves, 152A, 154A that are disposed vertically in relation to one another.

A third input is defined as the latency between two given blades. This latency index is calculated by using a topology representation of the pool of resources as input, by associating a weight to the connection between every blades depending on the number of hops (number of switches) in the path. For example, a function calculating this weight can use the following relation to allocate an index:

Let:
lsS=latency of blades in the same shelf
lsR=latency of blades in the same rack but different shelves
ldR=latency of blades in different racks Then:
lsS<lsR<ldR One example latency index scheme includes: blades in the same shelf 152A have a latency index of 1. Blades in the same rack 150A but on different shelves 152A, 154A have a latency index of 2. Blades in different racks 150A, 150B that use the same datacenter switch 130 have a latency index of 5. Blades in different racks, different datacenter switch have a latency index of 10.

A fourth input is defined as the redundancy index. The redundancy index represents the risk of having blades failing at the same time due to the fact that they are sharing common components. A function calculating this index can use the topology information to derive the risk from criteria such as, without limitation: common power supply, common switch, common rack, common console server, common UPS/battery pool, common data center and allocate an index to various configurations. One example redundancy index scheme includes: blades with the same shelf 152A have a redundancy index of 1. Blades in two different shelves 152A, 154A have a redundancy index of 2. Blades in two different racks 150A, 150B have a redundancy index of 5.

A set of eligible hardware resources that provides the best performance according to a set of predetermined guidelines can be selected from among a number of hardware resource allocations using a variety of techniques. For example, in one embodiment, a linear programming technique can be applied to the objective function in order to determine a set of eligible hardware resources that provides the best performance according to a set of predetermined guidelines.

Hardware Overview

Figure 4:
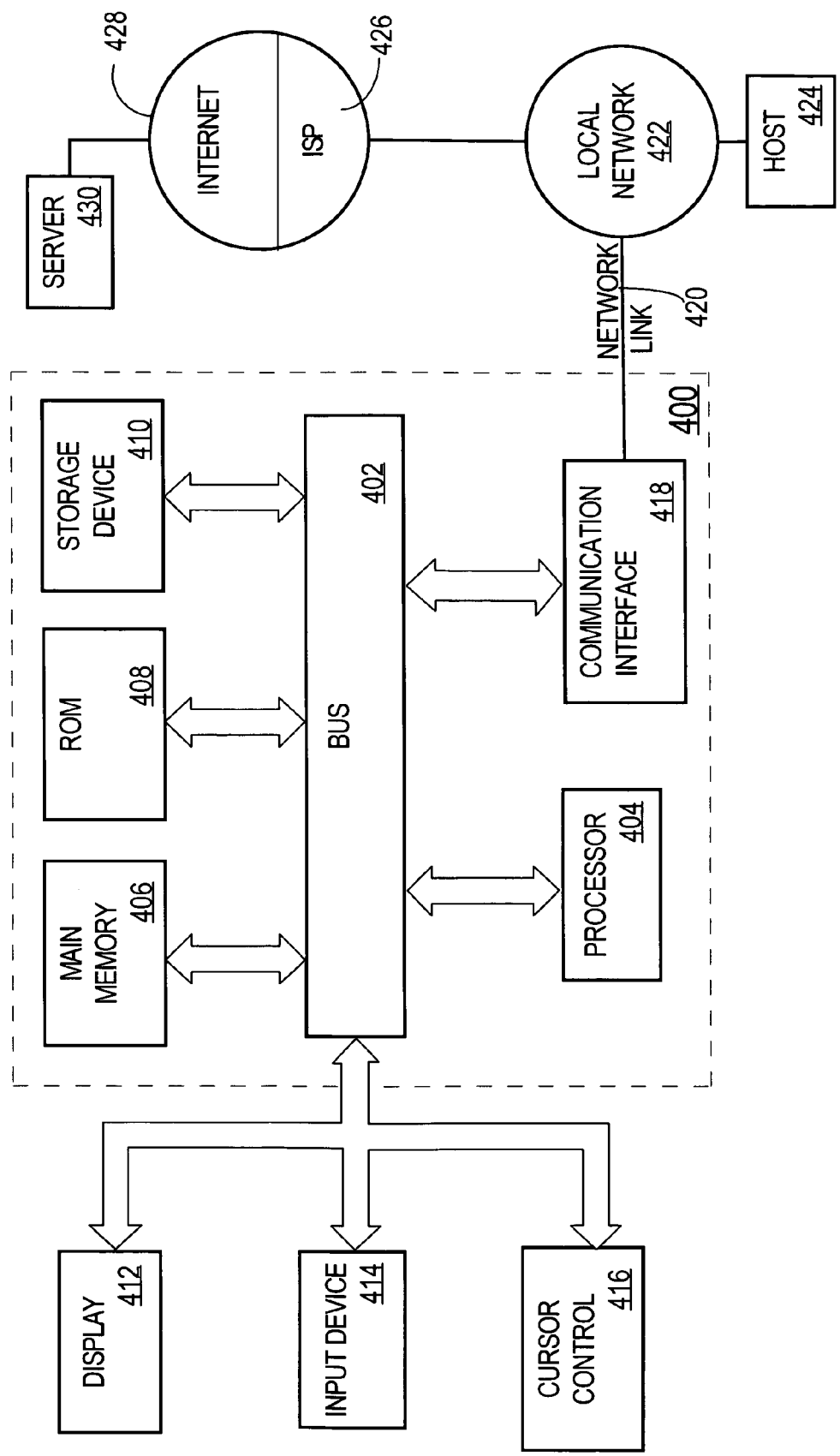
FIG. 4 is a hardware block diagram of an example computer system, which may be used to embody one or more components of an embodiment of the present invention.

FIG. 4 is a block diagram that illustrates a computer system 400 on which one embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A machine implemented method, comprising:
   receiving a request for an allocation of a set of hardware resources in a computing system, wherein the computing system is a distributed system comprising a plurality of physically distributed hardware resources;
   determining a set of one or more operational considerations to be applied to the allocation; and
   automatically determining at least one set of eligible hardware resources that satisfies the request, wherein determining the set of eligible hardware resources takes into account where each of the eligible hardware resources is physically situated relative to other physical resources and how that situation impacts the set of operational considerations, wherein automatically determining the at least one set of eligible hardware resources comprises automatically determining a plurality of sets of eligible hardware resources that satisfy the request, and
   selecting the set of eligible hardware resources that provides the best performance according to a set of predetermined guidelines, wherein selecting the set of eligible hardware resources comprises:
      determining an objective function relating reducing heat dissipation to a thermal index that changes with a distance between components, converting the set of one or more operational considerations to be applied to the allocation as a set of one or more constraint expressions, and applying a linear programming technique to determine an optimal solution of the objective function satisfying the constraint expressions.

2. The machine implemented method of claim 1, wherein determining the set of eligible hardware resources comprises: accessing a set of topology information which specifies how the hardware resources in the computing system are physically arranged and situated; and using the set of topology information in determining the set of eligible hardware resources.

3. The machine implemented method of claim 1, wherein relating reducing heat dissipation to the thermal index that changes with the distance between components, further comprises:

determining a thermal index (Ti) according to the relation:

$$Ti=d+(DL/(position-LB))+(DR/(RB-position));$$
wherein

LB=left component, RB=right component, DL=dissipation of the left component, DR=dissipation of the right component, d=dissipation of the new component, and position=position of the new component.

4. The machine implemented method of claim 1, wherein hardware resources include at least one of: host computers, firewalls, loader balancers, storage devices (local disk/NAS/SAN), processors, storage devices, peripheral devices, devices operable with a computer or processor based devices that enhance the functionality of the computer or processor based device.

5. The machine implemented method of claim 1, wherein determining a set of one or more operational considerations to be applied to the allocation includes:

determining a set of one or more operational considerations including at least one of:
reducing heat production,
reducing latency;
increasing availability, and
reducing power dissipation.

6. A machine-readable storage medium carrying one or more sequences of instructions for determining an allocation of resources, which instructions, when executed by one or more processors, cause the one or more processors to carry out the steps of:

receiving a request for an allocation of a set of hardware resources in a computing system, wherein the computing system is a distributed system comprising a plurality of physically distributed hardware resources;

determining a set of one or more operational considerations to be applied to the allocation; and automatically determining at least one set of eligible hardware resources that satisfies the request, wherein determining the set of eligible hardware resources takes into account where each of the eligible hardware resources is physically situated relative to other physical resources and how that situation impacts the set of operational considerations, wherein automatically determining the at least one set of eligible hardware resources comprises automatically determining a plurality of sets of eligible hardware resources that satisfy the request, and selecting the set of eligible hardware resources that provides the best performance according to a set of predetermined guideline, wherein selecting the set of eligible hardware resources comprises:

determining an objective function relating reducing heat dissipation to a thermal index that changes with a distance between components, converting the set of one or more operational considerations to be applied to the allocation as a set of one or more constraint expressions, and applying a linear programming technique to determine an optimal solution of the objective function satisfying the constraint expressions.

7. The machine-readable storage medium of claim 6, wherein the instructions for determining the set of eligible hardware resources further comprise instructions for carrying out the steps of:

accessing a set of topology information which specifies how the hardware resources in the computing system are physically arranged and situated; and using the set of topology information in determining the set of eligible hardware resources.

8. The machine-readable storage medium of claim 6, wherein the instructions for relating reducing heat dissipation to the thermal index that changes with the distance between components further comprise instructions for carrying out the steps of:

determining a thermal index (Ti) according to the relation: Ti=d+(DL/(position−LB))+(DR/(RB−position)); wherein LB=left component, RB=right component, DL=dissipation of the left component, DR=dissipation of the right component, d=dissipation of the new component, and position=position of the new component.

9. The machine-readable storage medium of claim 6, wherein the instructions for accessing a set of topology information which specifies how the hardware resources in the computing system are physically arranged and situated further comprise instructions for carrying out the steps of:

accessing a set of topology information which includes at least one of:
a distance, including a distance representing a spatial separation of components,
a configuration, including an index representing whether two processors exist in a same housing,
a system state, including a Boolean expression indicating whether a resource is unavailable; and
a policy, including a Boolean expression indicating whether a particular operating system is permitted.

10. The machine-readable storage medium of claim 6, wherein hardware resources include at least one of: host computers, firewalls, loader balancers, storage devices (local disk/NAS/SAN), processors, storage devices, peripheral devices, devices operable with a computer or processor based devices that enhance the functionality of the computer or processor based device.

11. The machine-readable storage medium of claim 6, wherein the instructions for determining a set of one or more operational considerations to be applied to the allocation further comprise instructions for carrying out the steps of:

determining a set of one or more operational considerations including at least one of:
reducing heat production,
reducing latency,
increasing availability, and
reducing power dissipation.

12. An apparatus comprising:
a processor;
a memory, connected to the processor by a bus; and
one or more stored sequences of instructions which, when executed by the processor, cause the processor to carry out the steps of:

receiving a request for an allocation of a set of hardware resources in a computing system, wherein the computing system is a distributed system comprising a plurality of physically distributed hardware resources;

determining a set of one or more operational considerations to be applied to the allocation; and automatically determining at least one set of eligible hardware resources that satisfies the request, wherein determining the set of eligible hardware resources takes into account where each of the eligible hardware resources is physically situated relative to other physical resources and how that situation impacts the set of operational considerations, wherein automatically determining the at least one set of eligible hardware resources comprises automatically determining a plurality of sets of eligible hardware resources that satisfy the request, and selecting the set of eligible hardware resources that provides the best performance according to a set of predetermined guideline, wherein selecting the set of eligible hardware resources comprises:

determining an objective function relating reducing heat dissipation to a thermal index that changes with a distance between components, converting the set of one or more operational considerations to be applied to the allocation as a set of one or more constraint expressions, and applying a linear programming technique to determine an optimal solution of the objective function satisfying the constraint expressions.

13. The apparatus of claim 12, wherein the instructions for determining the set of eligible hardware resources further comprise instructions for carrying out the steps of:

accessing a set of topology information which specifies how the hardware resources in the computing system are physically arranged and situated; and using the set of topology information in determining the set of eligible hardware resources.

14. The apparatus of claim 12, wherein the instructions for accessing a set of topology information which specifies how the hardware resources in the computing system are physically arranged and situated further comprise instructions for carrying out the steps of:

accessing a set of topology information which includes at least one of:

a distance, including a distance representing a spatial separation of components, a configuration, including an index representing whether two processors exist in a same housing, a system state, including a Boolean expression indicating whether a resource is unavailable; and a policy, including a Boolean expression indicating whether a particular operating system is permitted.

15. The apparatus of claim 12, wherein hardware resources include at least one of: host computers, firewalls, loader balancers, storage devices (local disk/NAS/SAN), processors, storage devices, peripheral devices, devices operable with a computer or processor based devices that enhance the functionality of the computer or processor based device.

16. The apparatus of claim 12, wherein determining a set of one or more operational considerations to be applied to the allocation further comprise instructions for carrying out the steps of:

determining a set of one or more operational considerations including at least one of:

reducing heat production, reducing latency, increasing availability, and reducing power dissipation.

17. An apparatus comprising:

means for receiving a request for an allocation of a set of hardware resources in a computing system, wherein the computing system is a distributed system comprising a plurality of physically distributed hardware resources;

means for determining a set of one or more operational considerations to applied to the allocation; and means for automatically determining at least one set of eligible hardware resources that satisfies the request, wherein determining the set of eligible hardware resources takes into account where each of the eligible hardware resources is physically situated relative to other physical resources and how that situation impacts the set of operational considerations, wherein means for automatically determining the at least one set of eligible hardware resources comprises means for automatically determining a plurality of sets of eligible hardware resources that satisfy the request, and means for selecting the set of eligible hardware resources that provides the best performance according to a set of predetermined guideline, wherein means for selecting the set of eligible hardware resources comprises:

means for determining an objective function relating reducing heat dissipation to a thermal index that changes with a distance between components, means for converting the set of one or more operational considerations to be applied to the allocation as a set of one or more constraint expressions, and means for applying a linear programming technique to determine an optimal solution of the objective function satisfying the constraint expressions.

* * * * *